(12) United States Patent
Eguchi et al.

(10) Patent No.: US 6,708,878 B2
(45) Date of Patent: Mar. 23, 2004

(54) SERVICE PROVIDING METHOD

(75) Inventors: Toshihiro Eguchi, Yokohama (JP); Michio Sato, Yokohama (JP); Manabu Miyatake, Kawasaki (JP); Hirofumi Nagano, Yokohama (JP); Toshiro Sasaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/987,846

(22) Filed: Nov. 16, 2001

(65) Prior Publication Data

US 2002/0121545 A1 Sep. 5, 2002

(30) Foreign Application Priority Data

Mar. 2, 2001 (JP) ........................................ 2001-057624

(51) Int. Cl.[7] ................................................ G06K 5/00

(52) U.S. Cl. ........................................ 235/380; 235/375

(58) Field of Search ................................ 235/380, 384; 705/6, 17

(56) References Cited

U.S. PATENT DOCUMENTS 3,958,103 A * 5/1976 Oka et al. .................... 194/210
5,450,051 A * 9/1995 Stromberg ................... 235/375
6,481,632 B2 * 11/2002 Wentker et al. .............. 235/492

OTHER PUBLICATIONS

Merriam–Webster OnLine Dictionary for "commutation ticket", no date.*
Matsuyama et al., "Distributed Digital–Ticket Management for Rights Trading System", ACM Conference on Electronic Commerce, 1999, pp. 110–118.
Integrated Transport Smartcard Organisation, The ITSO Specification for Interoperable Public Transport Ticketing Using Contactless Smartcards, Part 1, 2001.
Integrated Transport Smartcard Organisation, The ITSO Specification for Interoperable Public Trasnport Ticketing Using Contactless Smartcards, Part 3, 2001.
Integrated Transport Smartcard Organisation, The ITSO Specification for Interoperable Public Transport Ticketing Using Contactless Smartcards, Part 4, 2001.
Integrated Transport Smartcard Organisation, The ITSO Specification for Interoperable Public Transport Ticketing Using Contactless Smartcards, Part 5, 2001.

* cited by examiner

Primary Examiner—Thien M. Le
Assistant Examiner—Lisa M. Caputo
(74) Attorney, Agent, or Firm—Antonelli, Terry, Stout & Kraus, LLP

(57) ABSTRACT

When a user accesses an IC card system, the user intentionally registers processing or actions necessary for an IC card to an IC card management system, or the system determines a predetermined state to register the processing to the IC card management system. The IC card management system beforehand delivers the actions to an IC card terminal. Thereafter, when the user inserts the IC card of which the necessary actions have been registered to the IC card management system to the IC card terminal, the IC card terminal executes the actions corresponding to the IC card.

30 Claims, 18 Drawing Sheets

FIG. 16

| | | |
|---|---|---|
| 16010 — USER PROFILE INFORMATION | NAME | 16011 |
| | SEX | 16012 |
| | AGE | 16013 |
| | ADDRESS | 16014 |
| | PHONE No. | 16015 |
| | MAIL ADDRESS | 16016 |
| | CREDIT No. | 16017 |
| | SECRET No. | 16018 |
| 16020 — APPLICATION INFORMATION | CARD ID | 16021 |
| | USER ID | 16022 |
| | TICKET INFORMATION | 16023 |
| | BALANCE INFORMATION | 16024 |
| | POINT INFORMATION | 16025 |
| | ACTION EXECUTION HISTORY | 16026 |
| | CARD EXPIRATION TIME | 16027 |

SERVICE PROVIDING METHOD

BACKGROUND OF THE INVENTION

The present invention relates to an integrated-circuit (IC) card system for providing various services to users of IC cards such as a credit card, a cash card, and/or a passenger ticket.

In a known IC card system of prior art, when an IC card of a user is installed in an IC card terminal device, an operator or the user operates the terminal device. According to the contents of the operation, the IC card terminal device provides various services to the user. For example, U.S. Pat. No. 6,119,945 describes a prior-art technique of this kind.

SUMMARY OF THE INVENTION

In the IC card services of the prior art, the user or the operator must directly operate the IC card terminal, for example, to update a valid period or an expiration time of the IC card or to accumulate a value to a balance the IC card. This leads to a problem of usability such that a long line of users appears at a commutation ticket issuing/updating window for students and workers immediately before the beginning of a new term or the like, and a problem that the user must confirm the balance of his or her prepaid card to add a desired value to the balance. With increase of various services, there arises a problem that the user must conduct complex operation from the IC card terminal. It is therefore an object of the present invention to provide an IC card system having high usability in which highly developed services are available.

When a user accesses a service providing system employing a recording medium such as an IC card, the user registers, to the service providing system, actions or processing necessary for the recording medium including an IC card. The service providing system distributes the actions to service providing terminal devices such as IC card terminals. Thereafter, when the user installs, in a service providing terminal, the recording medium for which the actions have been registered in advance as above, the service providing terminal conducts the actions registered for the recording medium.

BRIEF DESCRIPTION OF THE DRAWINGS

The objects and features of the present invention will become more apparent from the consideration of the following detailed description taken in conjunction with the accompanying drawings in which:

FIG. 16 is a diagram showing information items stored in an IC card;

DESCRIPTION OF THE EMBODIMENTS

Referring now to FIGS. 1 to 18, description will be given of the contents of an example in which the present invention is applied to a service providing operation in an IC card system employed in a train ticket system using IC cards. First, description will be given of a first embodiment in accordance with the present invention.

Figure 1:
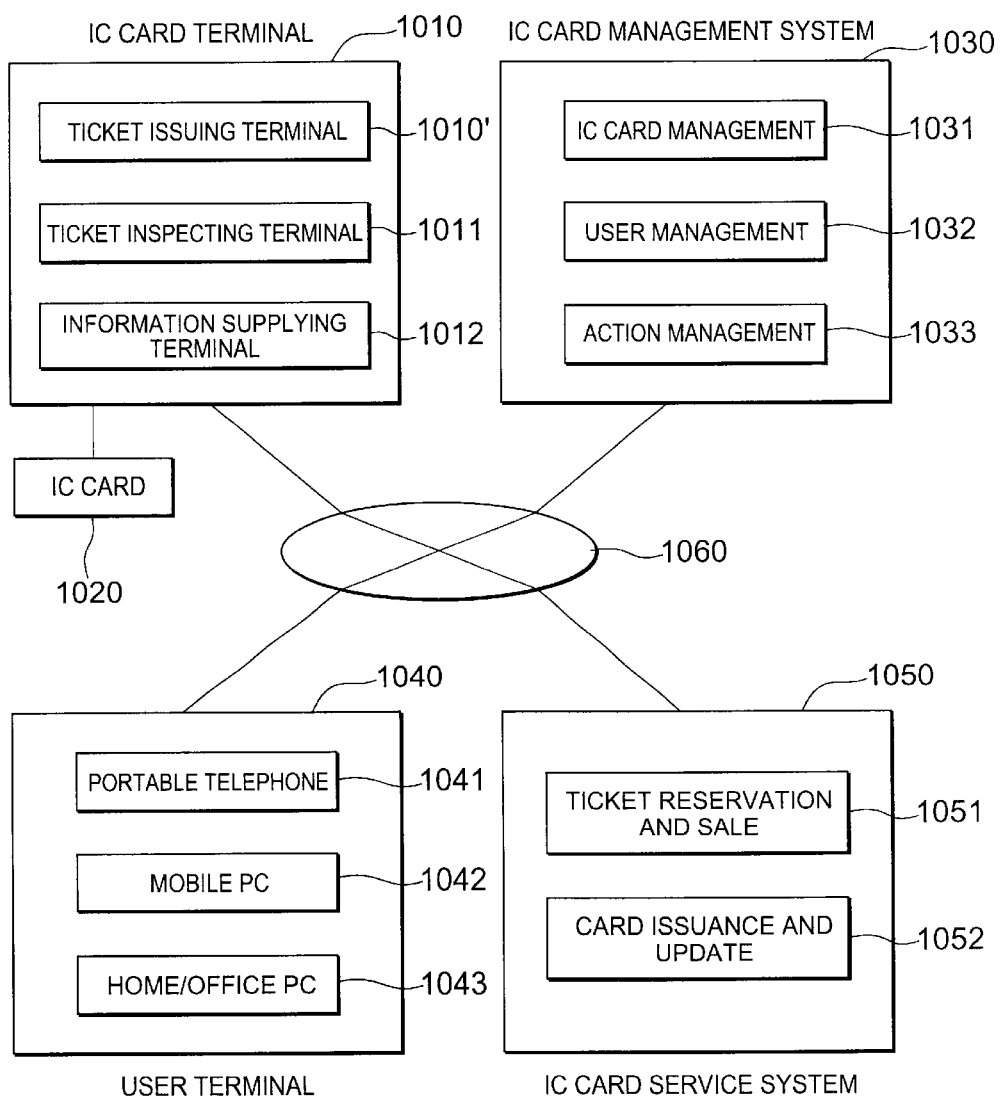
FIG. 1 is a block diagram showing an overall configuration of an IC card system.

FIG. 1 shows an overall configuration of a train IC card system. The system includes an IC card terminal 1010 to provide various services to users through IC cards, an IC card 1020 which can store various tickets such as a commutation ticket and a limited express ticket for a reserved seat, an IC card management system 1030 which operates to manage the overall IC card system, a user terminal 1040 such as a portable telephone or a personal computer (PC), an IC card service system 1050 to conduct such services as ticket reservation and sales service and a commutation ticket update service, and an information communication network 1060 to connects these subsystems to each other.

The IC card terminal includes a ticket issuing terminal to write various ticket information on an IC card in compensation for the associated charge, a ticket inspecting terminal 1011, and an information supplying terminal 1012 to supply various information such as sightseeing information. The IC card management system includes an IC card management section 1031 to manage IC card information, a user management section 1032 to manage information of users, and an action management section 1033 to manage various procedures for IC cards. The user terminal includes devices which can be connected via an information communication network to the IC card service system and the IC card management system such as a portable telephone 1041, a mobile PC 1042, and a home/office PC 1043. The IC card service system is represented by, for example, a web site to provide a ticket reservation and sales service, specifically, provides services such as a ticket reservation and sales service 1051 and an IC card issuance and update service 1052.

Figure 2:
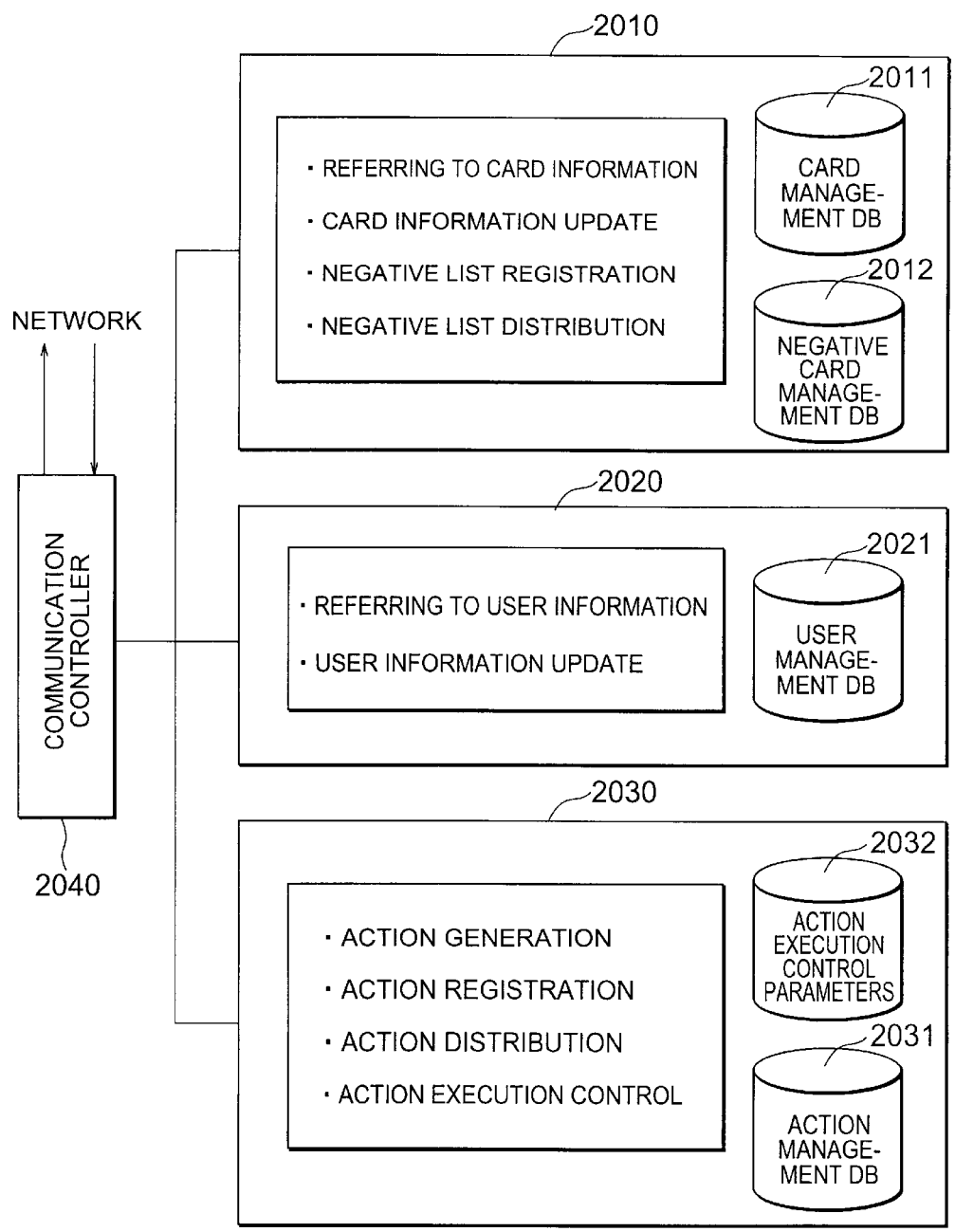
FIG. 2 is a diagram showing structure of an IC card management or control system.

FIG. 2 shows a configuration of an IC card management system. The system includes a card management section 2010, a user management system 2020, and an action management system 2030. Referring now to FIGS. 3 to 8, description will be given of an outline of a function of each section.

(1) Card Management Section

The card management section 2010 receives a request to refer to card information and/or a request to update card information from an IC card terminal, a user terminal, and an IC card service system connected to the IC card management system. In response to the requests, the card management section 2010 refers to or updates a card management database 2011 disposed to manage the entire IC card information in the IC card system. The card management system registers, to a negative (invalid) card management database 2012, IC cards which become invalid because of theft, loss, failure, or the like, and registers a negative identifier to a negative list of the terminal in which the card is used. The card management section 2010 thereby prevents unauthorized uses of invalid IC cards.

Figure 3:
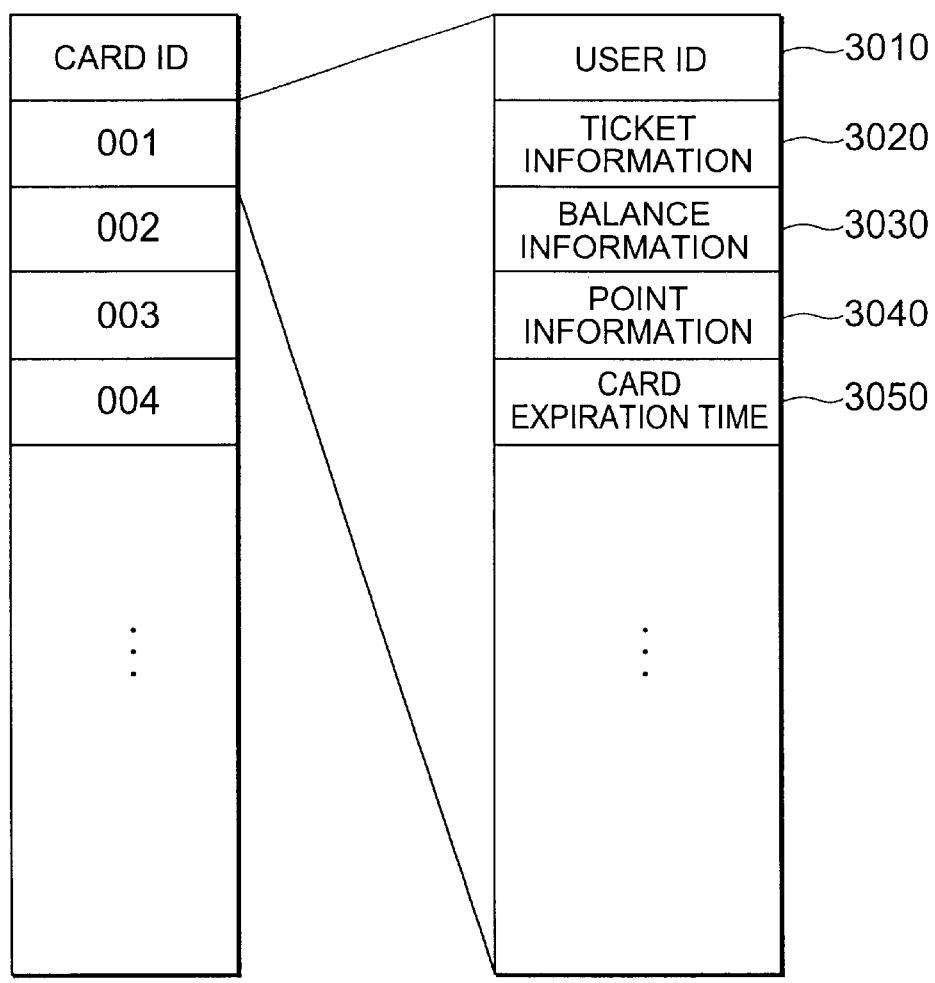
FIG. 3 is a diagram showing a data layout of a card management database.

FIG. 3 shows a data layout of a card management database. This is a database to manage information stored in each IC card and includes records each of which includes data items of a user ID 3010, ticket information 3020, balance information 3030, point information 3040, and a card expiration time 3050.

Figure 4:
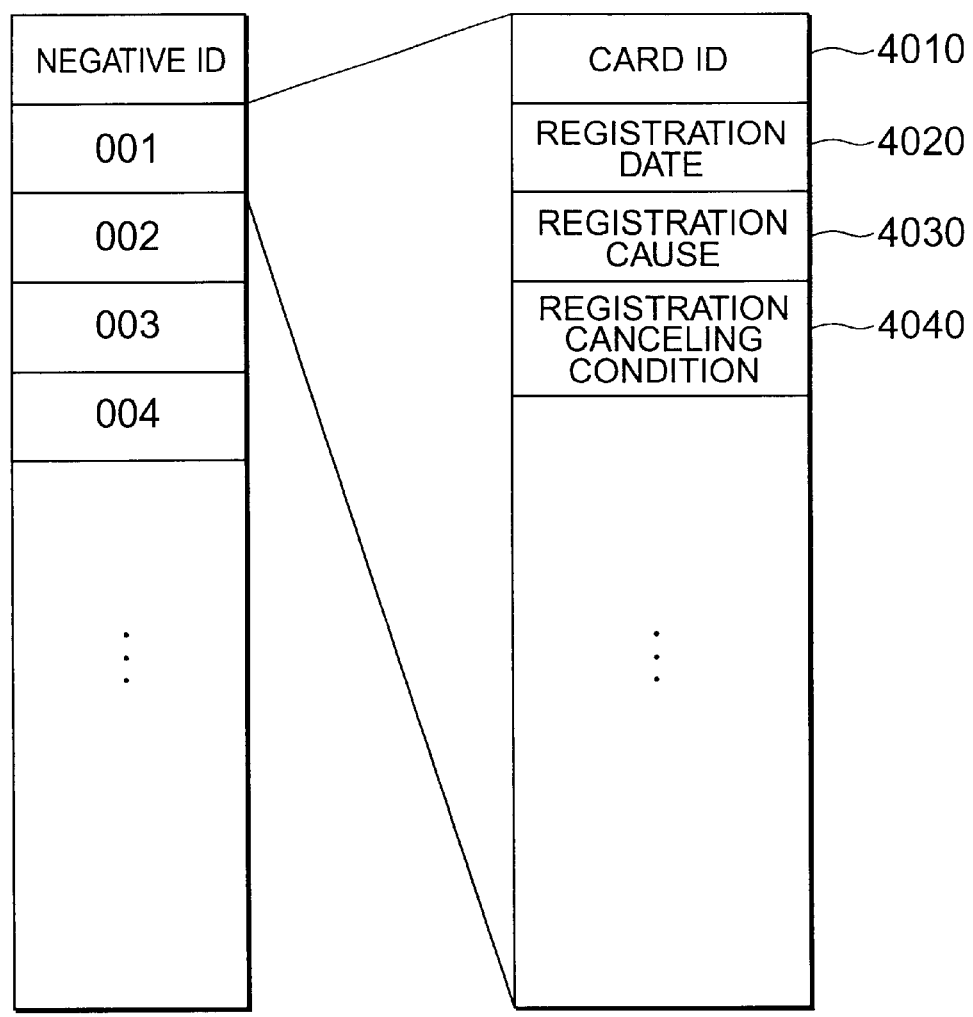
FIG. 4 is a diagram showing a data layout of a negative card management database.

FIG. 4 shows a data layout of a negative card management database. The database is disposed to manage IC cards which have become invalid because of theft, loss, failure, or the like. Each record of the database includes data items such as a card identifier 4010, a registration date 4020, a registration cause 4030, and a registration canceling condition 4040.

(2) User Management Section

The user management section 2020 receives a request to refer to card information and/or a request to update user information from an IC card terminal, a user terminal, and an IC card service system connected to the IC card management system. On receiving such requests, the user management section 2020 refers to or updates a user management database 2021 disposed to manage the overall user information in the IC card system.

Figure 5:
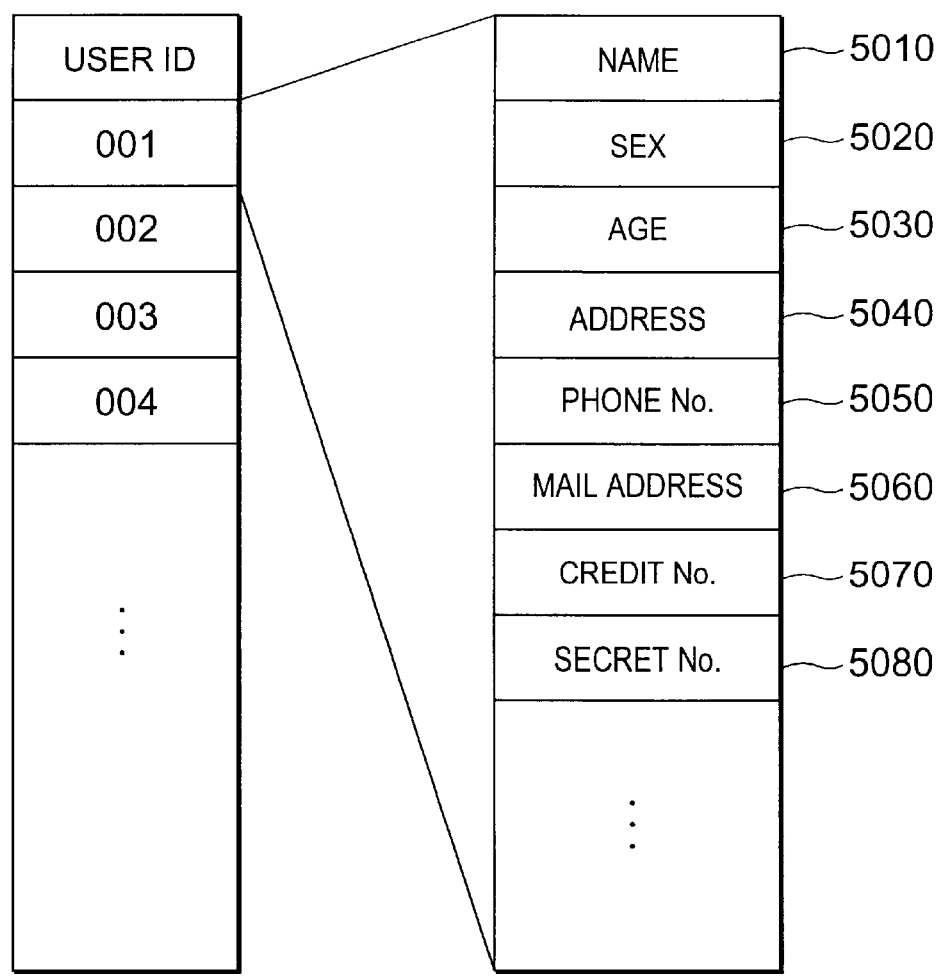
FIG. 5 is a diagram showing a data layout of a user management database.

FIG. 5 shows a data layout of a user management database. This is disposed to manage information of each user, and each record thereof includes fields of data items such as a name field 5010, a sex field 5020, an age field 5030, an address field 5040, a telephone number field 5050, a mail address field 5060, a credit number field 5070, and a secret number field 5080.

(3) Action Management Section

The action management section 2030 receives an action request for each card sent from a user terminal, an IC card terminal, and an IC card service system connected to the IC card management system. Having received the requests, the action management section 2030 refers to action execution control parameters 2032 and generates an action corresponding to the request. The section 2030 distributes the action to an IC card terminal specified according to a type of the action and then registers the action to the action management database 2031.

Figure 6:
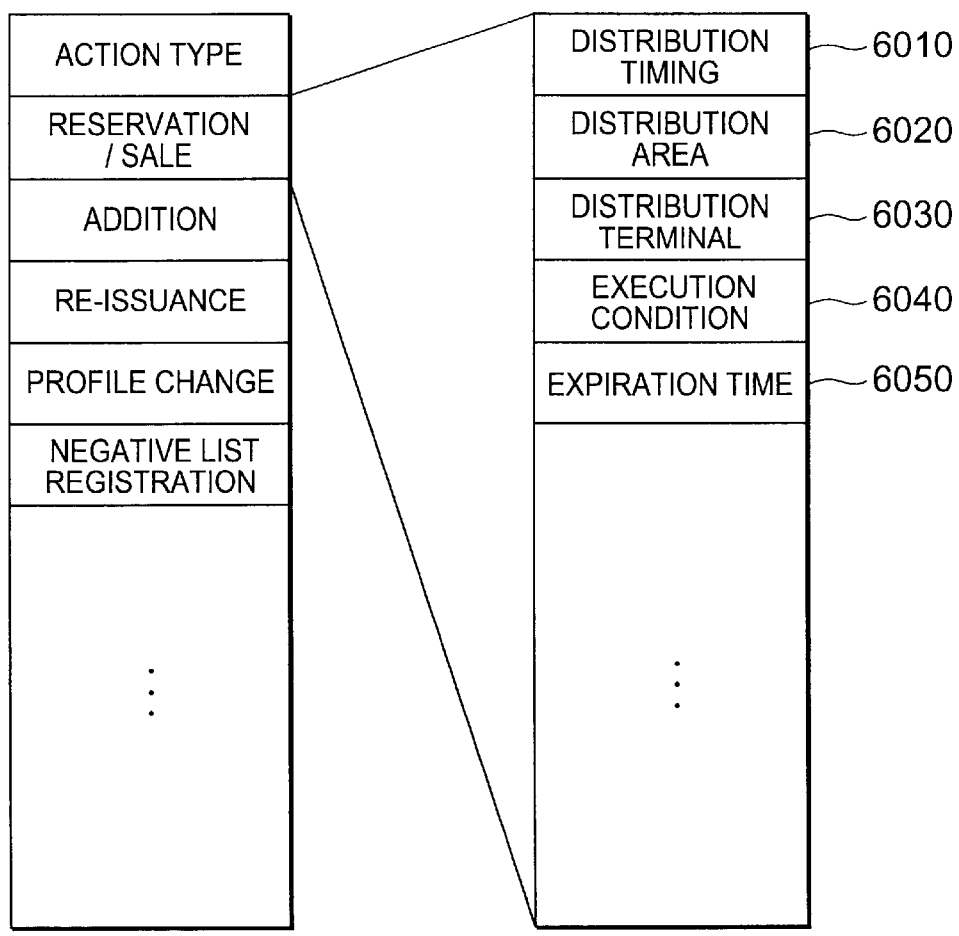
FIG. 6 is a diagram showing a data layout of a configuration of action execution control parameters.

FIG. 6 shows a configuration of action execution control parameters. The parameters are used to define a distributing condition, an expiration time, and the like of the action for each action type. The parameters include distribution timing 6010 to specify a distribution condition of time, a distribution area 6020 to specify a distribution condition of an area, a distribution terminal 6030 to specify a distribution condition for each type of IC card terminal, an executing condition 6040 to specify action executing condition, and an action expiration time 6050.

Figure 7:
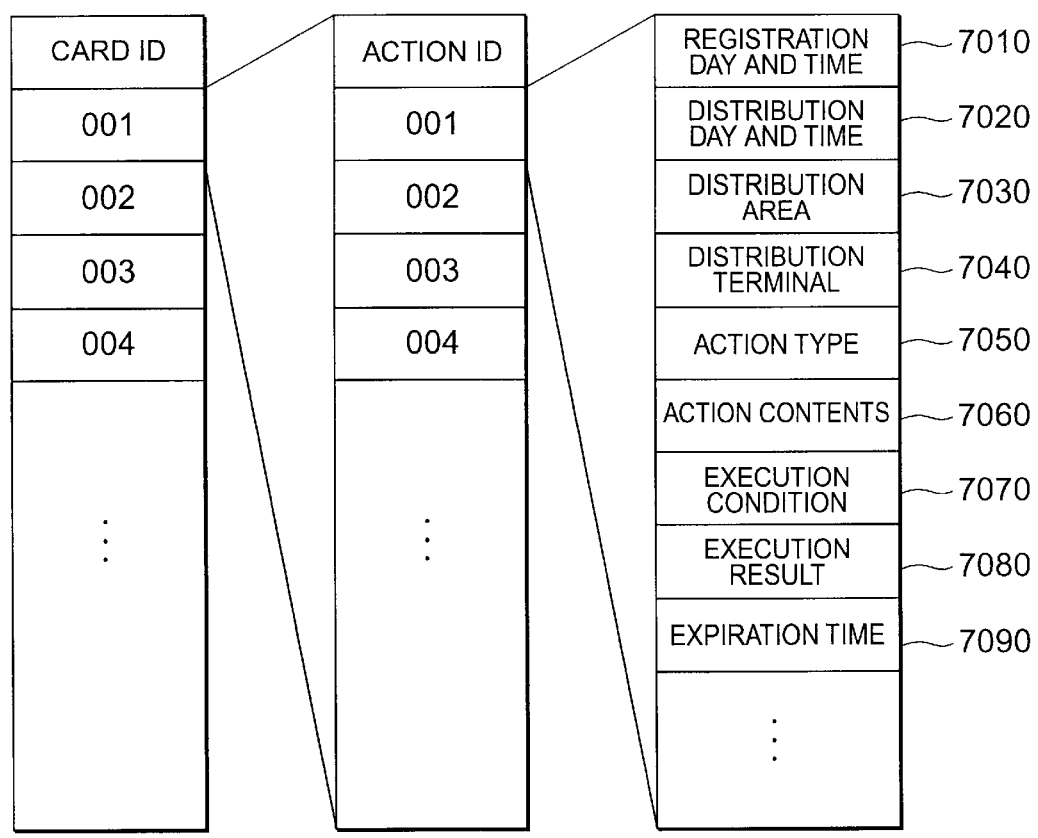
FIG. 7 is a diagram showing a data layout of an action management database.

FIG. 7 shows a configuration of an action management database. In this database, each action registered for each IC card is managed using an action identifier (ID), namely, a serial number sequentially set to the action in a sequence of action registration. Each action includes data items such as an action registration day and time 7010, IC card terminal distribution day and time 7020, a distribution area 7030, a distribution terminal 7040, an action type 7050, action contents 7060, an execution condition 7070, an execution result 7080, and an expiration time 7090.

Figure 8:
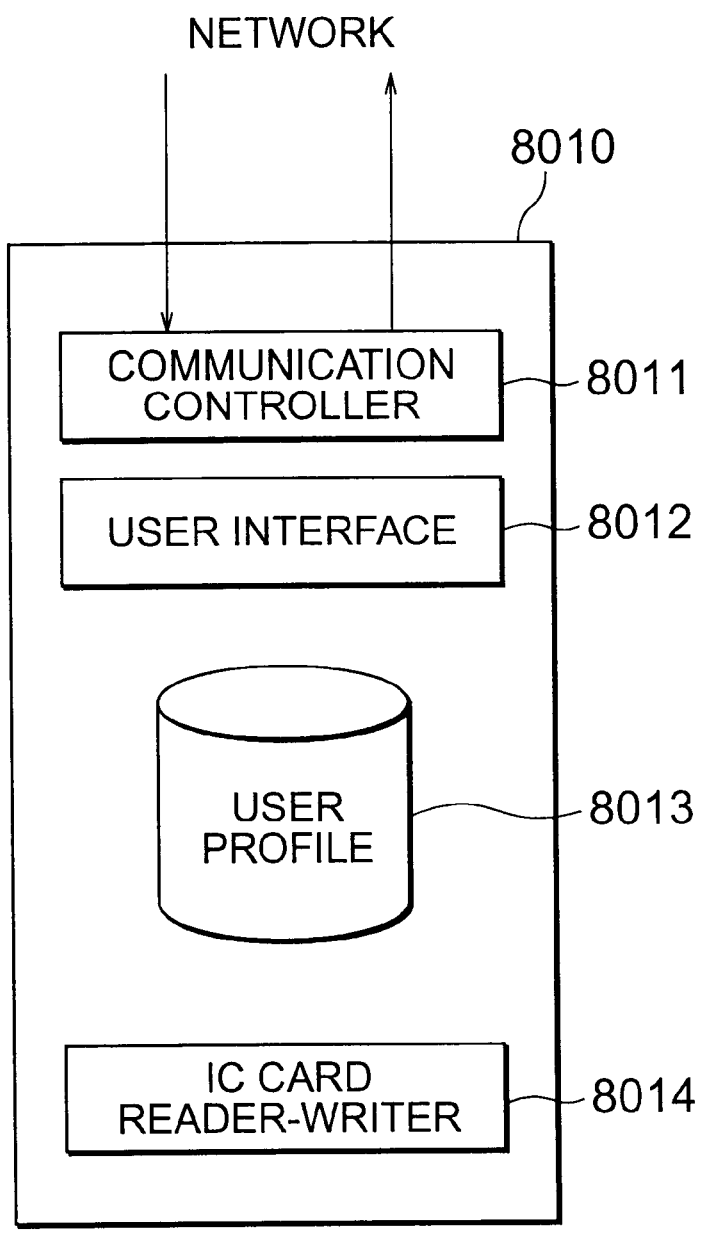
FIG. 8 is a diagram showing a configuration of a user terminal.

FIG. 8 shows a construction of a user terminal 8010. The terminal 8010 can access via an information communication network the IC card management or control system and the IC card service system and includes a communication controller 8011, a user interface section 8012, and a user profile 8013. The terminal 8010 may also include an IC card reader-writer 8014 depending on cases.

Figure 9:
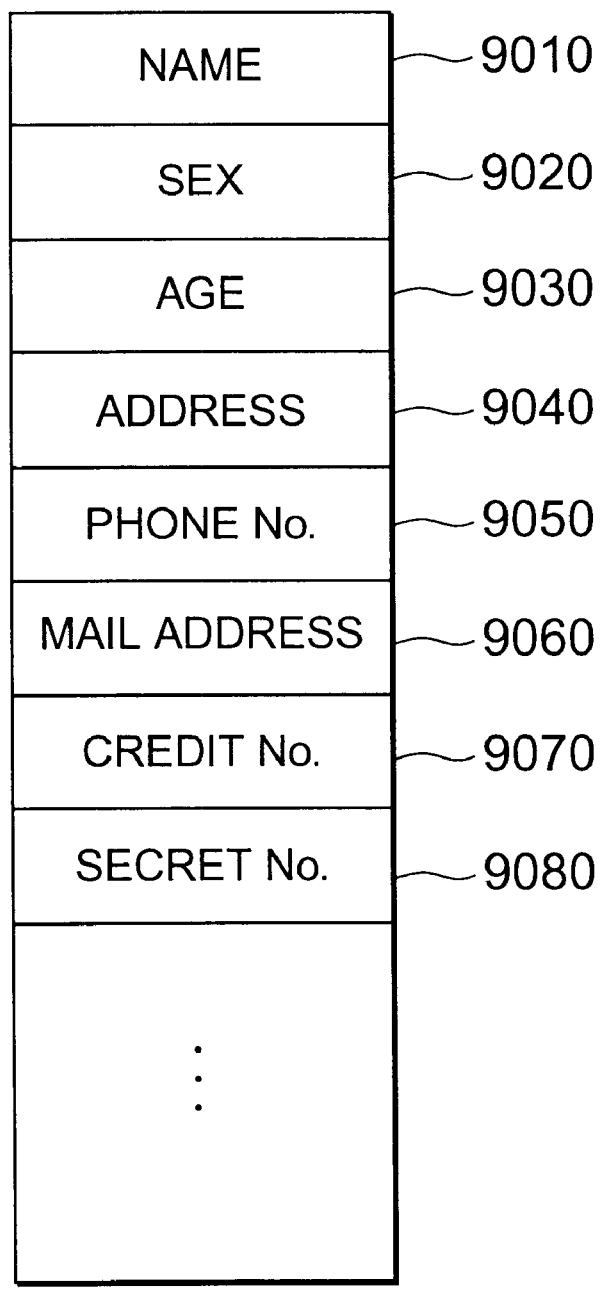
FIG. 9 is a diagram showing a data layout of a user profile.

FIG. 9 shows a data layout of a user profile. Each record of the user profile includes a name 9010, a sex 9020, an age 9030, an address 9040, a telephone number 9050, a mail address 9060, a credit number 9070, and a secret number 9080.

Figure 10:
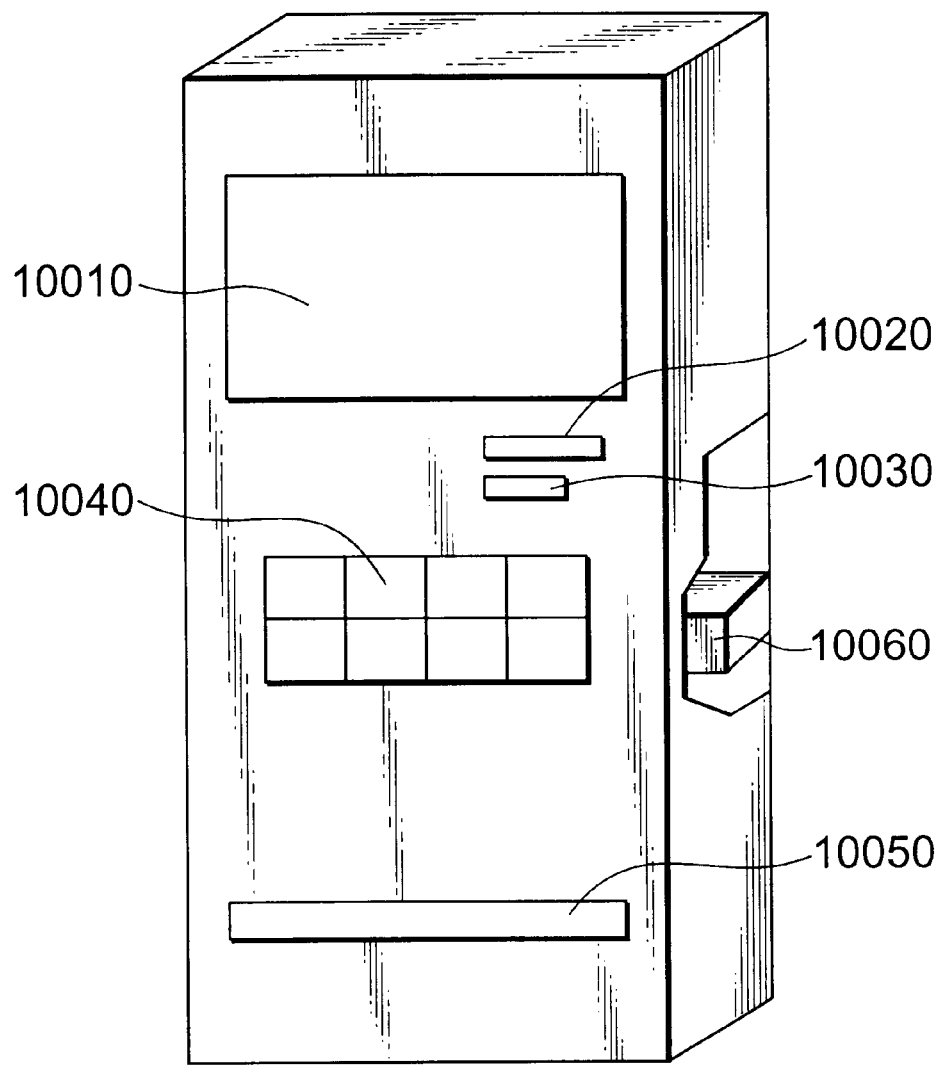
FIG. 10 is a perspective view showing a configuration of an IC card terminal such as a ticket issuing terminal, a fare adjusting terminal, or a value adding terminal.

FIG. 10 shows, in a perspective view, an outline of an example of an IC card terminal, namely, a terminal which is used to issue a ticket, to add a value, and to conduct fare adjustment. The terminal includes a display 10010, an IC card input section 10020, a cash inlet 10030, an operator's panel 10040, an ejecting slit 10050, and a computing section 10060. The display conducts guidance of various operations for users. The IC card input section 10020 includes an IC card reader-writer which can conduct read and write operations of information of IC cards having various functions as, for example, a credit card and a commutation ticket. The operator or user inputs cash from the cash inlet 10030. The user inputs a command from the operator's panel 10040 according to a desired service. In the IC card issuance or update, when change takes place, the change is ejected from the ejecting slit 10050. When the user installs an IC card in the IC card inlet 10020, the computing section 10060 first confirms validity of the IC card, and then determines presence or absence of an action corresponding to the card. If an effective action exits, the computing section 10060 conducts the action, and then achieves various services in response to operations of the user.

Figure 11:
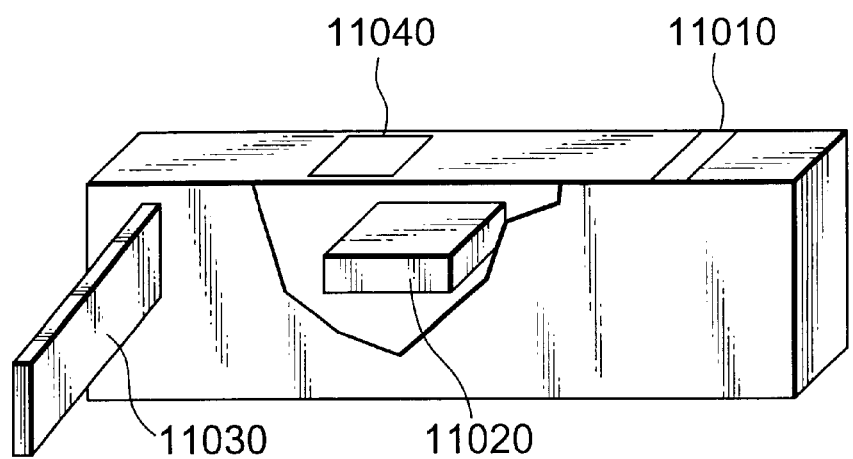
FIG. 11 is a perspective view showing a configuration of an IC card terminal, namely, a ticket inspecting terminal.

FIG. 11 shows, in a perspective view, another example of the card IC terminal, namely, a contactless IC card inspection device. The card user passes the card inspection device while placing his or her IC card over an IC card input section 11010. A computing section 11020 of the inspection device first determines validity of the IC card. If the card is not valid, the computing section 11020 closes a gate 11030 to prevent passage of the user and displays a cause of passage rejection for the pertinent IC card in a display window 11040. Next, the computing section 11020 determines presence or absence of an action for the card. If there exists an efficient action, the computing section 11020 executes the action, and then executes processing of ordinary ticket inspection.

Figure 12:
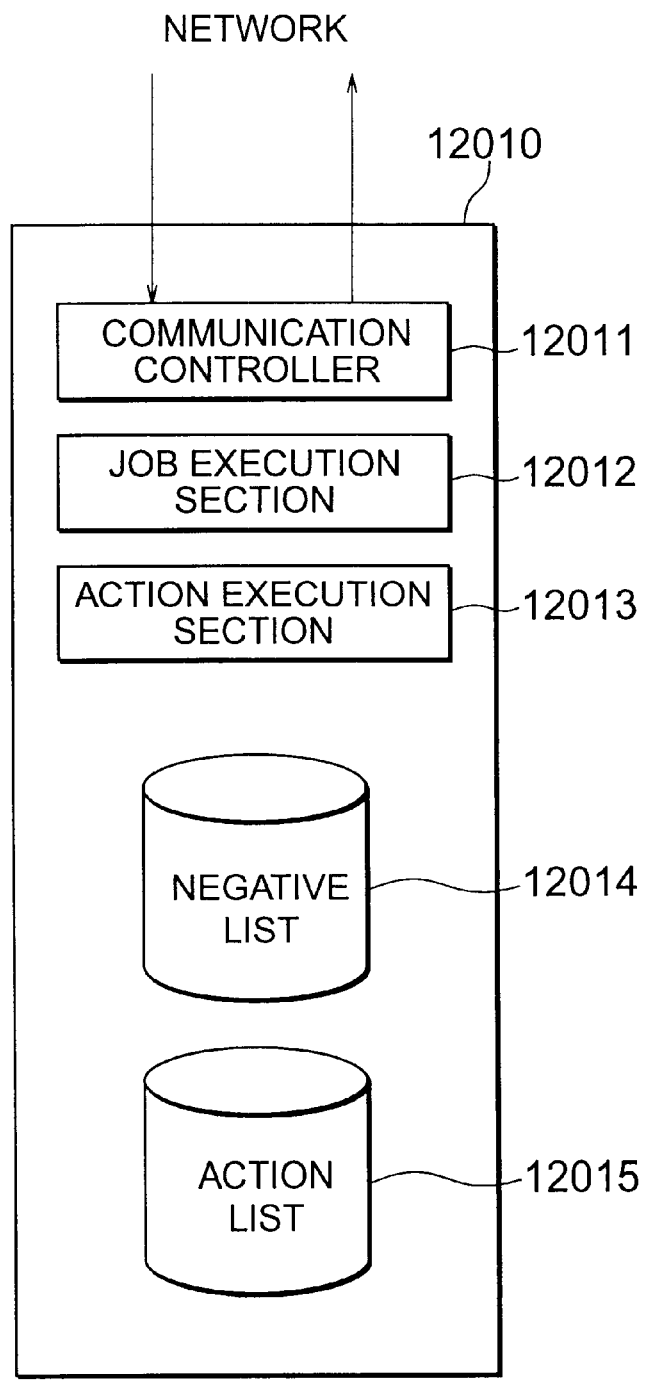
FIG. 12 is a perspective view showing structure of a computing section of IC card terminal.

FIG. 12 shows a configuration of the computing section 12010 of the IC card terminal. The computing section 12010 includes a communication controller 12011 to communicate information with the IC card management system, a job execution section 12012 to control jobs of the IC card terminal such as the ticket inspection, the ticket issuance, and the fare adjustment, an action execution section 12013 to execute actions stored in the action list, a negative list 12014 to store ID information of invalid cards, and action list 12015 to store an execution procedure for each IC card.

Figure 13:
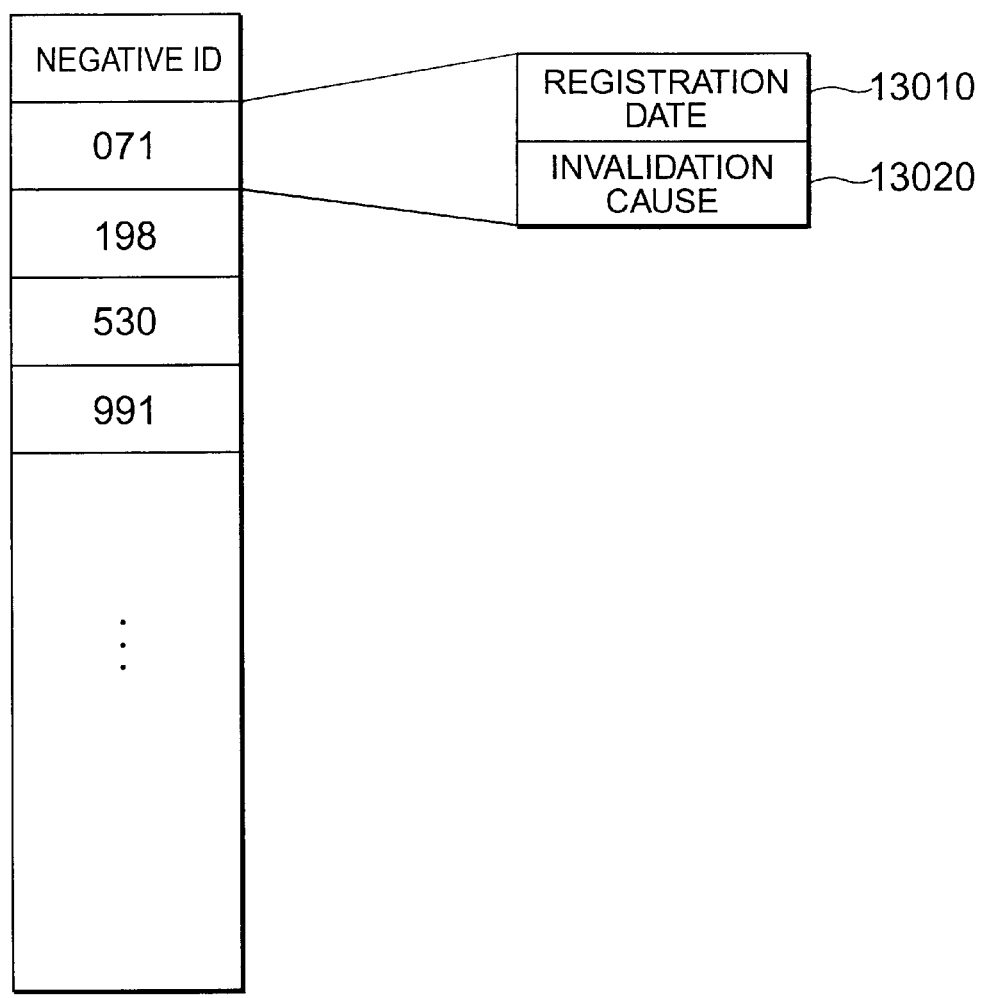
FIG. 13 is a diagram showing a data layout of a negative list.

FIG. 13 shows a negative list to store ID information of invalid cards. Each record of the negative list includes a registration day and time 13010 and an invalidation cause 13020 for each identifier (ID).

Figure 14:
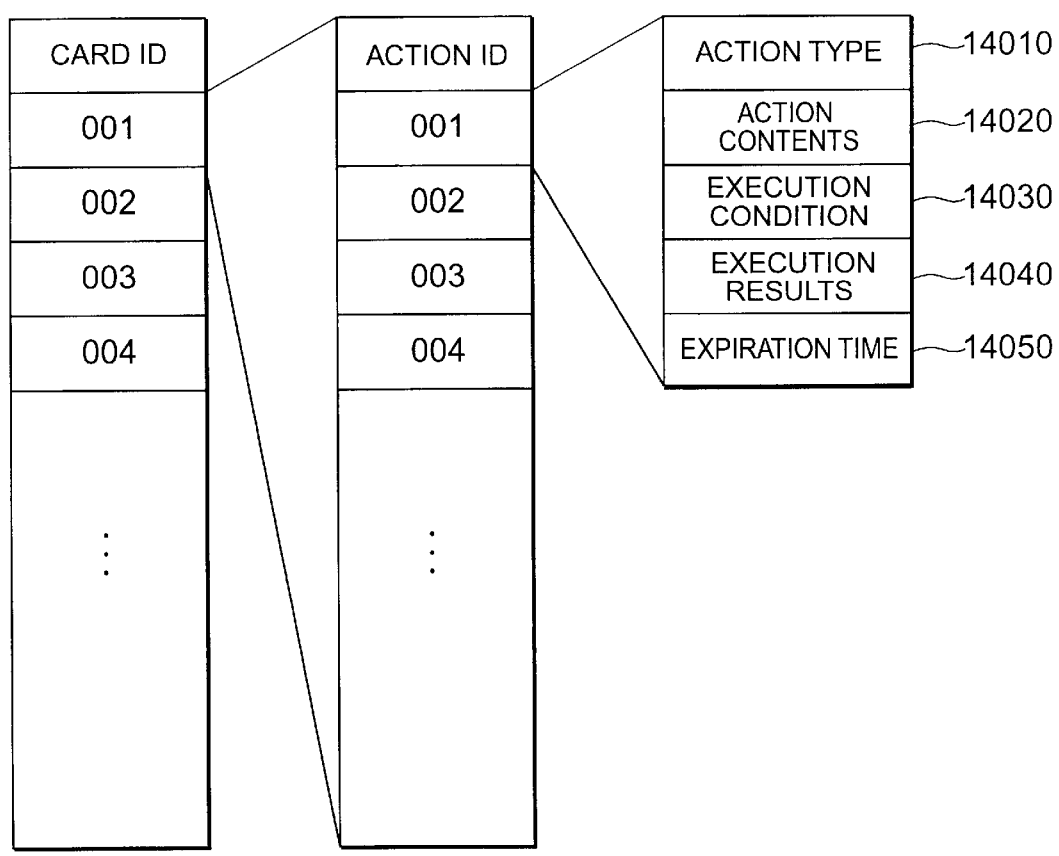
FIG. 14 is a diagram showing a data layout of an action list.

FIG. 14 shows an action list to store an execution procedure for each IC card. In the action list, an action registered for each IC card is managed according to an action ID sequentially set as a serial number in an order of registration. Each record of the action list includes data items of an action type 14010, action contents 14020, an execution condition 14030, execution results 14040, and an expiration time 14050.

Figure 15:
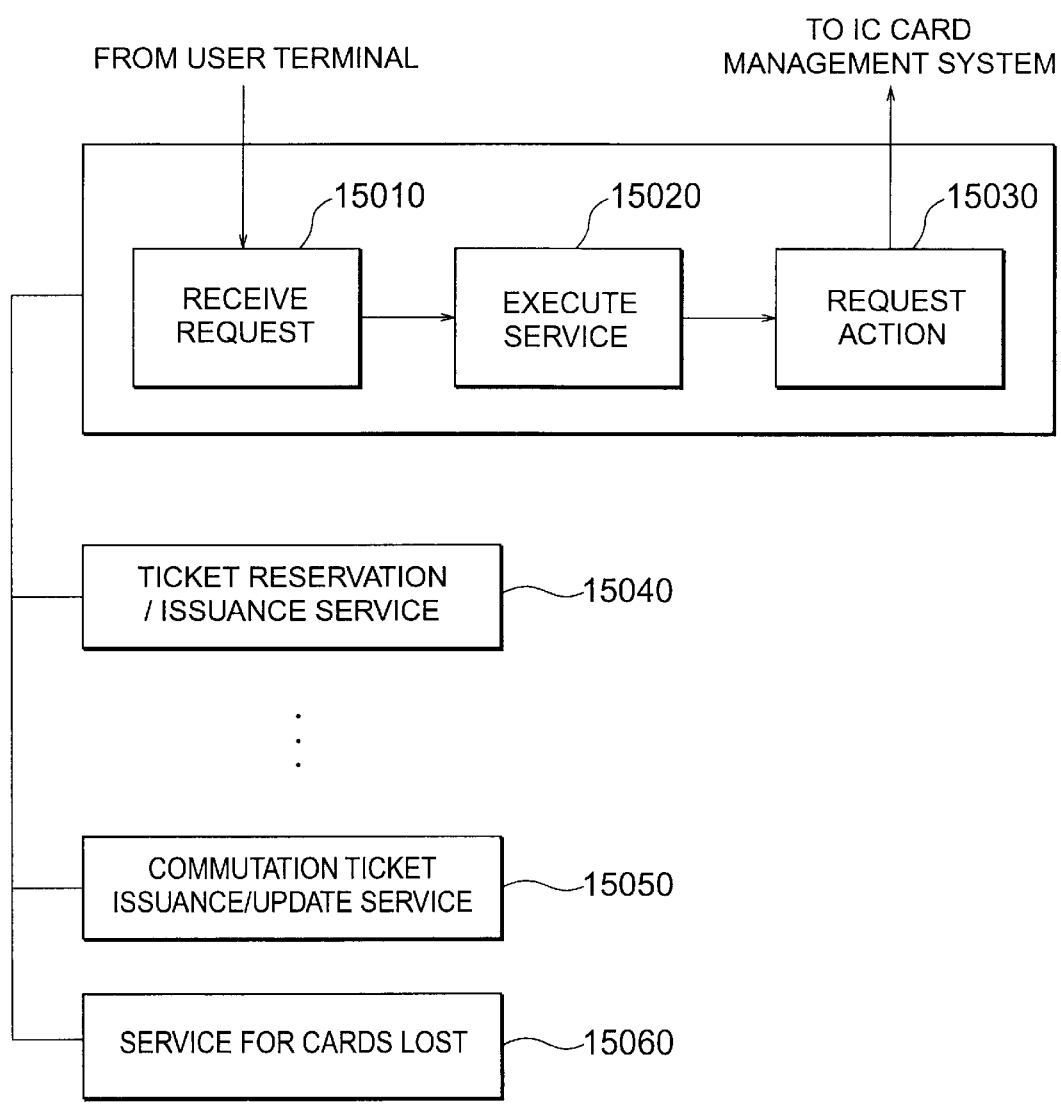
FIG. 15 is a block diagram showing structure of an IC card system.

FIG. 15 shows a configuration of an ID card service system. The system includes a request receiving section 15010 to receive requests from a user terminal and an IC card terminal connected to the network, a service execution section 15020 to execute services according to requests, an action request section 15030 to send results of execution of a service to the IC card management system, and various service functions such as a ticket reservation and issuance service 15040, a commutation ticket issuance/update service 15050, and a service for card lost 15060. Description will be given of an outline of processing of the ticket reservation/issuance service. When the request receiving section 15010 receives a ticket reservation/sale request of a reserved seat from a user, the service execution section 15020 refers to free-seat information managed by its own system or an external system to conduct a reservation/settlement procedure by conversing with the user. The action request section 15030 sends ticket information and a user identifier obtained as a result of the service execution to the IC card management system. The IC card management system generates a ticket issuance action and distributes the action to a ticket issuing device or the like.

FIG. 16 shows a data layout of IC card storage information. The information includes user profile information 16010 and application information 16020. The user profile information 16010 includes a name 16011, a sex 16012, an age 16013, an address 16014, a telephone number 16015, a mail address 16016, a credit number 16017, and a secret number 16018. The application information includes a card identifier 16021, a user identifier 16022, ticket information 16023 storing various tickets such as a commutation ticket, a reservation ticket, and a hotel coupon; balance information 16024 storing a balance of prepaid value or electronic money, point information 16025, action execution history 16026, and a card expiration time 16027.

Figure 17:
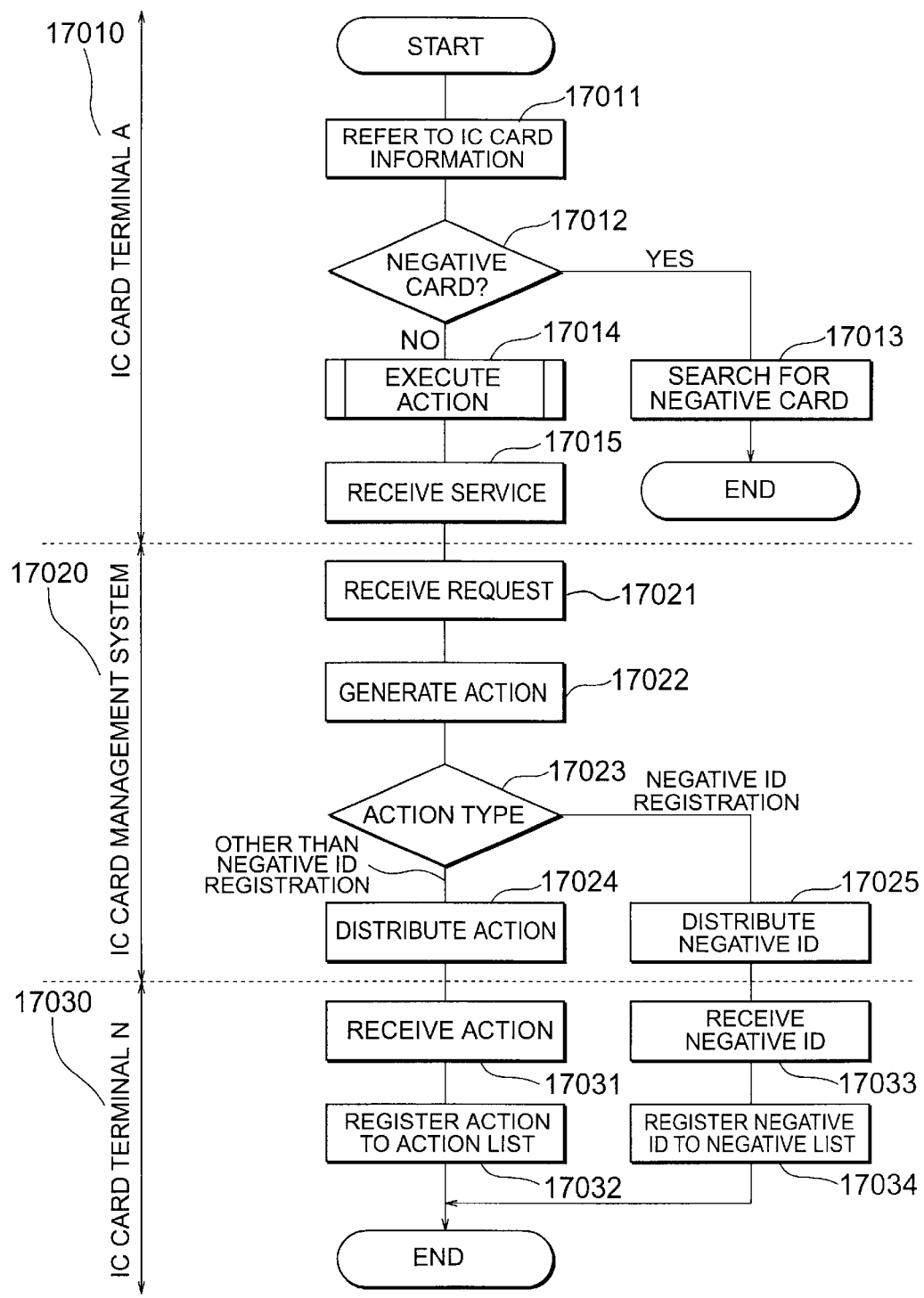
FIG. 17 is a flowchart showing an overall processing flow.

FIG. 17 shows an overall flow of processing to register and to execute an action from an IC card terminal. The processing of action registration using a user terminal and an IC card service system basically includes the same processing flow as this processing flow, and hence description thereof will be avoided.

Description will next be given of the overall system processing flow, specifically, processing of an IC card terminal A 17010 being used by an operator, processing of an IC card management system 17020, and each IC card terminal N 17030.

IC Card Terminal A (step 17010)

To receive one of various services, a user or an operator installs an IC card in the IC card terminal A. First, in step 17011, the IC card terminal A reads storage information from the IC card. In step 17012, the terminal A collates a card ID in the storage information obtained in step 17012 with a negative list of the IC card terminal A to determine whether or not the ID number is already registered to the negative list. If the IC card has already been registered to the negative list, the terminal A executes negative card detection processing in step 17013 and terminate the service for the IC card in the terminal A. If the IC card has not been registered to the negative list, the processing proceeds to step 17014 to execute action execution processing, which will be described in detail later. When action execution processing is finished, the processing goes to step 17015 to user the service of the IC card terminal A. The step corresponds to an ordinary job of the terminal A, namely, to processing of ticket inspection, processing of ticket issuance, and processing of addition of a balance amount. In this step, according to a request inputted by the user to receive the service and rules beforehand specified, for example, a rule to automatically add 1000 Yen to the balance when the balance of the IC card becomes 300 Yen or less; the IC card terminal A generates user request information and sends the information to the IC card management system.

In this example, the request of the user is sent from an IC card terminal. However, it is also possible that the user inputs a request from a user terminal to send the request directly to the IC card management system and the user generates a request using a user terminal and an IC card service system to send the request to the IC card management system. Specific request examples of various services are as follows.

(A) Request to change a user profile from a user terminal (B) Request to automatically transfer an amount of monthly fare from the IC card service system (C) Request to issue a reservation ticket from the IC card service system IC Card Management System (Step 17020)

On receiving a request from a user in step 17021, the IC card management system generates an action for the request in step 17022.

If the request is, for example, an addition of 3000 Yen to the balance of the IC card, the IC card management system generates an action to send the action to the action management database as below.

Pertinent card ID is set according to the contents of the request.

Action ID is set to a value obtained by adding one to a maximum value of the action identifier already registered to the pertinent card identifier.

Registration day and time are set to the current time.

Distribution area is set according to action control parameters.

Action contents are set according to the contents of the request.

Execution condition is set according to action control parameters.

Execution results are set "not executed" as a default value.

Expiration time is set according to the current time and action control parameters.

Subsequently, in step 17023, the IC card management system refers to an action type generated in the preceding step. If the action type is "negative list registration", the system registers, in step 17025, an identifier number of the IC card to the negative card management database and distributes ID information to the IC card terminal. If the action type is other than "negative list registration", the system goes to step 17024 and distributes the action generated before to an IC card terminal specified by the distribution area.

IC Card Terminal N (step 17030)

When an action is received in step 17031, the card terminal N registers the action to the action list 17032. When a negative identifier is received in step 17033, the terminal N registers the negative identifier to the negative list in step 17034.

Figure 18:
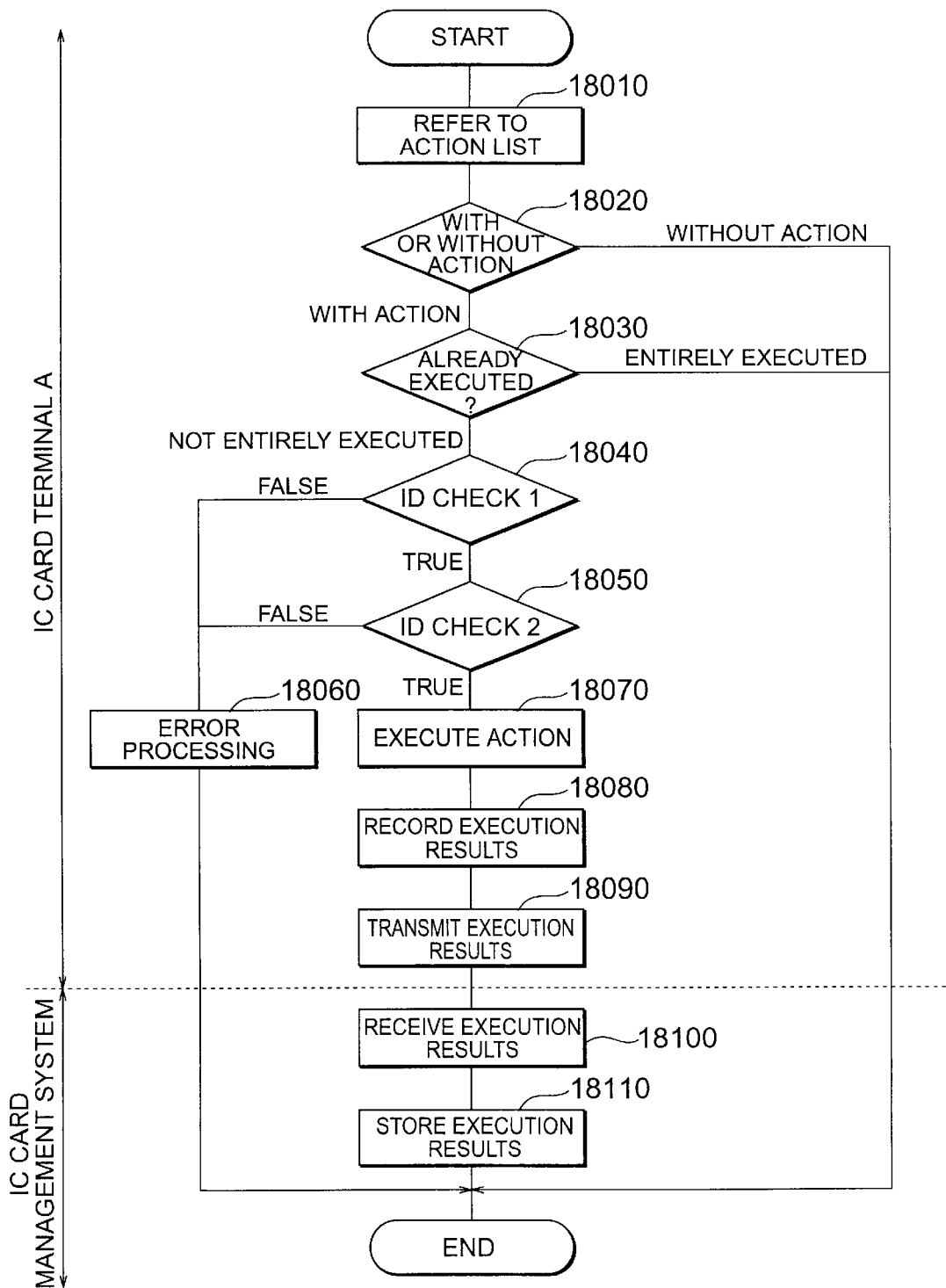
FIG. 18 is a flowchart showing a processing flow to execute actions.

Next, description will be given of the action execution processing. FIG. 18 shows a detailed processing flow of step 17014, i.e., action execution processing of FIG. 17. In the processing, an action list in the own system is collated in step 18010 with the identifier number of the IC card which is being used and which has already been referred to. In step 18020, a check is made to determined whether or not an action corresponding to the card ID has been registered to the action list. If the action has not been registered, the action execution processing is terminated. Otherwise, a check is made in step 18030 to determine whether or not the action has already been executed. This is conducted by determining whether or not the pertinent action ID is included in action execution history stored in the IC card. If all actions corresponding to the IC card have already conducted, the action execution processing is terminated. Otherwise, the processing goes to step 18040 to conduct action identifier check 1.

In action identifier check 1, a check is made to determine whether or not a minimum value of one or more non-executed action identifiers is equal to a value obtained by adding one to an executed action identifier stored in the action execution history of the IC card. If the minimum value is equal to the obtained value, the processing goes to step 18050 to conduct action identifier check 2. Otherwise, processing goes to step 18060 to execute error processing, for example, an error cause is notified to the user and/or a request is issued to the ID management system to download a latest action list. In step 18050, a check is made to determine whether or not the non-executed action identifiers are completely sequential. If there exists an action identifier not sequential in the identifiers, the processing goes to step 18070 to execute error processing. If all action identifiers are sequential, processing goes to step 18070 to execute a non-executed action. Next, in step 18080, a result of the execution is stored in the action execution history of the IC card. In step 18090, the execution result is sent to the IC card management system. The system receives the execution result in step 18100 and then stores the execution result in the action management database in step 180110.

Subsequently, description will be given of a second embodiment of the present invention. In the second embodiment, predetermined services are conducted by a ticket inspection device by use of a station server device installed at each station or in each predetermined region. Specifically, in the second embodiment, the station server device executes at least part of the processing executed by the IC card management system in the foregoing embodiment. In this situation, each of the predetermined regions may include a plurality of stations.

For example, the station server device may include the function of the card Management Section 2010. In this case, the station server device may execute processing for management data regarding users (IC cards) associated with the pertinent station (region). Data of the other users may be transmitted to station server devices corresponding to the users or the IC card management system so that the data is processed therein.

In this situation, the negative list registration may be achieved by distributing a negative list from the IC card management system to each station server device. It is also possible in this case that the data set to the station server device includes only the data of users associated with the station server.

The addition of the value to the IC card may be carried out according to an indication from the station server device. That is, the station server device receives information from an IC card terminal, and then the IC card terminal executes the value addition according to an indication from the station server device. It is also possible that the IC card terminal executes the value addition for an IC card having particular identification information. After the value addition, the IC card terminal notifies the condition to the station server device and/or the IC card management system. In response thereto, the station server device and/or the IC card management system conduct/conducts associated processing. For example, a request for settlement is notified to a computer of a bank or the like. The station server devices are connected to the network 1060.

The present invention also includes a mode in which when an IC card passes a ticket inspection device, a fare of an interval traveled using the IC card is charged. First, when a passenger having a card including an IC card passes a ticket inspection device, the device reads the card to obtain identification information of the user or the card. When the passenger leaving a station passes a ticket inspection device using the card, the device similarly obtains identification information. The IC card management system receives these identification information. According to the information, the system calculates a fare traveled by the passenger. The system sends, to a settlement organization, the result of the calculation and a settlement request to charge the user identified by the identification information. The settlement organization executes processing to transfer the charged amount from an account of the user to an account of an enterprise providing the service.

In the mode, the card may store value information representing a value of money. It is also possible in this operation that the ticket inspection device draws a value of the price from the card when the passenger enters or leaves a station.

The present invention also includes a program product which is used to execute the processing of the embodiments and which can be stored on a computer readable storage medium.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A service providing system comprising:
   a storage medium storing identification information for identifying said storage medium and service information for providing services to a user associated with said storage medium;
   a service providing terminal for providing a service by reading said service information from said storage medium through communication with said storage medium; and
   a management device connected with said service providing terminal via a network, for managing said storage medium,
   wherein said management device creates a pre-authorized user-related service management instruction for altering said service information stored in said storage medium and distributes said service management instruction to said service providing terminal,
   when receiving said service management instruction from said management device, said service providing terminal stores the received service management instruction so as to have a correspondence relationship with the identification information of said storage medium, and when communicating with said storage medium, said service providing terminal reads the identification information of said storage medium and executes the received service management instruction to alter said service information stored in said storage medium if said service providing terminal holds the received service management instruction corresponding to the identification information of said storage medium.

2. A service providing system according to claim 1, wherein said service management instruction is information indicating update of a period of time in which said services can be received.

3. A service providing system according to claim 2, wherein:
   said storage medium is a commutation ticket of a transportation facility;
   said services allow the user to travel by the transportation facility;
   said service information is update of the commutation ticket.

4. A service providing system according to claim 1, wherein said storage medium is an integrated-circuit (IC) card.

5. A service providing system according to claim 1, wherein said management device creates and distributes said service management instruction based on request information including an executing condition specified by the user.

6. A service providing system according to claim 1, wherein:
   said management device holds destination data for determining at least one service providing terminal as a destination of said service management instruction, and
   said management device selects said at least one service providing terminal based on said destination data from among a plurality of service providing terminals, and distributes said service management instruction to said at least one service providing terminal.

7. A management service apparatus using a storage medium having stored service information for a user to receive services for executing information processing to provide the services according to the service information, comprising:
   means for storing a pre-aurthrized user-related service management instruction indicating management services to provide the services which are registered for each storage medium and which are to be executed for each storage medium;
   means for receiving identification information being stored on said storage medium and identifying said storage medium to which, when said storage medium and a service providing terminal device satisfy a pre-determined positional relationship for the user to receive the services, said service providing terminal device transmits said identification information via a network; and
   means for executing information processing to execute for said storage medium a management service indicated by said service management instruction corresponding to the identification information transmitted from said service providing terminal device to alter said stored service information if said service providing terminal holds the received service management instruction corresponding to the identification information of said storage medium.

8. A management service apparatus according to claim 7, wherein said service management instruction is information indicating update of a period of time in which said services can be received.

9. A management service apparatus according to claim 8, wherein:
   said storage medium is a commutation ticket of a transportation facility;
   said services allow the user to travel by the transportation facility;
   said service management instruction is update of the commutation ticket.

10. A management service apparatus according to claim 9, wherein:
    said means for executing the information processing transmits, to said service providing terminal device, service management instruction corresponding to the identification information; and
    said service providing terminal device executes a management service indicated by the service management instruction transmitted to said storage medium.

11. A management service apparatus according to claim 10, wherein said storage medium is an IC card.

12. A service providing terminal device using a storage medium having stored service information for a user to receive services for executing information processing to provide the services according to the service information, comprising:
    means for reading, from said storage medium, identification information identifying said storage medium and being stored on said storage medium when said storage medium and a service providing terminal device satisfy a predetermined positional relationship for the user to receive the services;
    means for transmitting said identification information via a network to a management device;
    means for receiving a pre-authorized user-related service management instruction from said management device via said network, said service management instruction being stored in said management device and indicating management services to provide the services which are registered for each storage medium and which are to be executed for each storage medium; and
    means for executing a management service for said storage medium, said management service being indicated by the service management instruction received from said management device to alter said stored service information if the received service management instruction corresponds to the identification information of said storage medium.

13. A service providing terminal device according to claim 12, wherein said service management instruction is information indicating update of a period of time in which said services can be received.

14. A program product which can be stored on a computer readable storage for making a management service apparatus execute processing, said management service apparatus using a storage medium having stored service information for a user to receive services for executing information processing to provide the services according to the service information, said processing comprising the steps of:
    storing a pre-authorized user-related service management instruction indicating management services to provide the services which are registered for each storage medium and which are to be executed for each storage medium;
    receiving identification information being stored on said storage medium and identifying said storage medium to which, when said storage medium and a service providing terminal device satisfy a predetermined positional relationship for the user to receive the services, said service providing terminal device transmits said identification information via a network; and performing information processing to execute for said storage medium a management service indicated by a service management instruction corresponding to the identification information transmitted from said service providing terminal device to alter said stored service information if the received service management instruction corresponds to the identification information of said storage medium.

15. A program product according to claim 14, wherein said service management instruction is information indicating update of a period of time in which said services can be received.

16. A program product according to claim 14, wherein:

said storage medium is a commutation ticket of a transportation facility;

said services allow the user to travel by the transportation facility;

said management service is update of the commutation ticket.

17. A service providing system for providing services to a user by using a storage medium having stored identifier information for identifying the storage medium, comprising:

a service providing terminal for executing, to said storage medium, processing of a management service related to the services; and a management apparatus for transmitting management service information to said terminal, said management service information including contents of management services for storage media and identifier information of the storage information of the storage media, said management service information being registered on a storage medium basis in said management apparatus, wherein said terminal receives and stores said management service information from said management apparatus;

when said terminal identifies a storage medium which stores identifier information matched with identifier information included in said management service information, said terminal executes, to the storage medium thus identified, processing of a management service indicated by said management service information corresponding to the identifier information stored in the storage medium thus identified; and said management service information includes serial numbers set in an order of registration of said management service information registered on a storage medium basis in said management apparatus.

18. A service providing system according to claim 17, wherein said management service is an update of a period of time in which said services can be received.

19. A service providing system according to claim 18, wherein said storage medium is a commutation ticket of a transportation facility;

said services allow the user to travel by the transportation facility; and said management service is an update of the commutation ticket.

20. A service providing system according to claim 17, wherein said management service is an update of a quantity in which the services can be received.

21. A service providing system according to claim 20, wherein said services allow the user to purchase an article or to travel by a transportation facility; and said management service is an increase or decrease of a prepaid value or a point indicating said quantity.

22. A service providing system according to claim 17, wherein said storage medium is an integrated-circuit (IC) card.

23. A service providing system according to claim 17, wherein said terminal checks whether or not continuous serial numbers of unexecuted management services are contained in said management service information.

24. A service providing system according to claim 23, wherein said terminal refers to execution history in said storage medium, and judges, based on said execution history, whether or not the management service indicated by said management service information has been executed.

25. A service providing system according to claim 17, wherein said management service is an action, and said management service information is an action list.

26. A service providing system according to claim 18, said management service information includes information as to a transmission timing of said management service information and as to a service providing terminal to which said management service information is transmitted; and said management apparatus refers to said information as to the transmission timing of said management service information and as to said service providing terminal, and transmits said management service information to said service providing terminal.

27. A management service apparatus for providing services to a user by using a storage medium having stored identifier information for identifying the storage medium, comprising:

store means for storing management service information including contents of management services to be executed to storage media and identifier information of the storage media, said management service information being registered on a storage medium basis in said store means;

means for receiving identifier information of a storage medium from a service providing terminal, when a relationship between the storage medium and the terminal for executing processing of a management service to the storage medium satisfies a condition necessary for the user to receive the services; and means for distributing, to the terminal, managament service information as to a storage medium corresponding to the identifier information thus received, when said receiving means receives the identifier information, wherein said management service information includes serial numbers set in an order of registration of said management service information registered on a storage medium basis in said store means.

28. A management service apparatus for providing services to a user by using a storage medium having stored identifier information for identifying the storage medium, comprising:

store means for storing management service information including contents of management services to be executed to storage media and identifier information of the storage media, said management service information being registered on a storage medium basis in said store means;

means for receiving an update request of services transmitted from a service providing terminal which is connectable to a storage medium, said request including identifier information of the storage medium; and means for creating, when said receiving means receives the identifier information, the management service information as to the storage medium corresponding to the identifier information in said request, and distributing the management service thus created to the terminal, wherein said management service information includes serial numbers set in an order of registration of the management service information registered on a storage medium basis in said store means.

29. A service providing terminal for providing services to a user by using a storage medium having stored identifier information for identifiying the storage medium, comprising:

reader means for reading identifier information from a storage medium, when a relationship between the storage medium and said terminal satisfies a condition necessary for the user to receive the services;

means for receiving management service information from a management apparatus, said management service information including contents of management services to be executed to storage media and identifier information of the storage media, said management service information being registered on a storage medium basis in said management apparatus; and execution means for storing the management service information thus received, and executing, to the storage medium, processing of a management service indicated by management service information corresponding to the identifier information corresponding to the identifier information thus read from the storage medium by said reader means, wherein said management service information includes serial numbers set in an order of registration of said management service information registered on a storage medium basis in said management apparatus.

30. A service providing terminal according to claim 29, further comprising means for checking whether or not continuous serial numbers of unexecuted management services are set in said management service information.

* * * * *